United States Patent [19]

Shepard

[11] Patent Number: 5,549,422
[45] Date of Patent: Aug. 27, 1996

[54] AUTOMATIC WATER FLUSHING METHOD FOR A HYDRATOR

[75] Inventor: James M. Shepard, Hockessin, Del.

[73] Assignee: General Chemical Corporation, Parsippany, N.J.

[21] Appl. No.: 418,813

[22] Filed: Apr. 7, 1995

Related U.S. Application Data

[62] Division of Ser. No. 94,259, Jul. 19, 1993, Pat. No. 5,447, 394.

[51] Int. Cl.⁶ .................................................. B65G 53/00
[52] U.S. Cl. ............................................. 406/48; 406/153
[58] Field of Search ................................. 406/10, 12, 14, 406/46, 47, 48, 108, 122, 124, 125, 126, 136, 137, 144, 146, 151, 152, 153

[56] References Cited

U.S. PATENT DOCUMENTS

| 4,824,294 | 4/1989 | Kortenbusch et al. | 406/14 X |
| 4,884,925 | 12/1989 | Kemp et al. | 406/153 X |
| 5,110,366 | 5/1992 | McGregor | 406/48 X |

*Primary Examiner*—Andrew C. Pike
*Attorney, Agent, or Firm*—Arthur J. Plantamura

[57] ABSTRACT

An improved hydration method heat avoids clogging for the transfer, solvation, and storage of dry particulate matter for a sealed solvation hopper chamber in combination with a liquid driven eductor and equipped to be connected to a storage container. Specifically, the improvement resides in the steps of reducing the flow of the dry particular matter and flushing the solvating hopper with water automatically at predetermined periodic intervals.

6 Claims, 3 Drawing Sheets

3 # AUTOMATIC WATER FLUSHING METHOD FOR A HYDRATOR

This is a divisional of application Ser. No. 08/094,259, filed Jul. 19, 1993, now U.S. Pat. No. 5,447,394.

BACKGROUND OF THE INVENTION

1. Field of the Invention

This invention relates to an apparatus for a hydrator in a system for transferring a dry chemical from a source and hydrating the chemical, particularly soda ash, which automatically and periodically flushes the hydrator with water to remove any solids accumulation which may occur during hydration, without the need to shut down the system.

2. Description of the Related Art

Various means have been described for transferring and hydrating dry Chemicals. U.S. Pat. No. 3,512,842 relates to a method for unloading rail cars in which a slurry is formed inside the rail car and then is pumped out. Such a process has numerous drawbacks, however, including the risk of overflowing or foaming within the car; the need for specialized rail cars adapted for use in the slurrying process; the possibility of corrosive solutions being formed and damaging the rail car; and problems with the residual moisture causing caking and the formation of hard, slowly dissolving lumps when liquid is added to the large quantity of solid. A similar approach is described in U.S. Pat. No. 4,189,262.

Commonly assigned U.S. Pat. No. 4,884,925, incorporated by reference herein, relates to an apparatus and method for transfer and slurrying of hydratable dry bulk chemicals. The apparatus has a sealed solvation hopper positioned between a liquid driven eductor and a fitting for connection to a storage container such as a railroad car. At the inlet end of the solvation hopper is a chemical inlet pipe which connects the interior to the exterior of the hopper. Surrounding the chemical inlet pipe are a plurality of nozzles for introduction of solvation liquid into the hopper. The nozzles are disposed such that the solvation liquid washes the interior surface of the hopper to prevent plugging by hydrates (solvates) which may be formed. The outlet end of the hopper is connected to a suction opening of the liquid driven eductor.

Liquid driven eductors do not require large volumes of air or steam and can be used to transfer dry chemicals from a container, such as a railroad car, forming a solution or slurry of the chemical in the liquid carrier medium. In operation, liquid flowing through the eductor creates a suction and draws dry chemical out of the storage container and into the hopper. In the hopper, solvation liquid is supplied through the nozzles to wet the dry chemical and to wash the surfaces of the hopper, pushing the wetted material toward the outlet end of the hopper. At the outlet end of the hopper, the wetted material is sucked out into the eductor where it is combined with the flow of eductor liquid. The material leaving the eductor is recovered and sent to storage or directly for processing. The process and apparatus are particularly useful for handling soda ash, or calcium chloride.

Blockages in the hydrator of U.S. Pat. No. 4,884,925 have occurred with slurry storage systems at expected unloading rates. However, units discharging to solution storage systems have exhibited none of these difficulties on a long term basis. Frequent plugging of the hydrator has been attributed to fineness of the soda ash, lumps in the soda ash, or improper hydrator operation. To clear the blockages, the flow of soda ash has been decreased or derated, or additional labor has been provided to routinely unplug the hydrator. Internal blockages may have been further aggravated by excessive temperatures that promote flashing of the solvation liquid with resulting additional blockages, all of which can render the hydrator unproductive, and require the shutdown of the system for a long period of time.

U.S. Pat. No. 5,071,289 relates to a particulate delivery system having a closed storage hopper for the material, an eductor, and a gas inlet and feed valve. To remove blockages, the apparatus includes a purge mode where the hopper and feed valves are closed, a stir valve is activated, and pressurized gas is fed into the hopper in an upward motion.

SUMMARY OF THE INVENTION

Briefly described, the invention comprises an automatically operated flushing apparatus for use with a hydrator in a system which transfers a dry chemical from a source and hydrates the chemical. The flushing apparatus periodically flushes and removes the inception of solids accumulation or potential blockages which occur during the hydration and transfer of solid particulate material from a storage container, particularly when a slurry solution is desired. The flushing occurs in timed intervals which provides maximized unloading rates without the need to shutdown the system. The periodic flushing anticipates and precludes the occurrence of a blockage. The solids accumulation generally occur in the slurry cone or chamber of a hydrator which finally seals the slurry cone entry area. When the slurry cone entry area is blocked, air flow is stopped. Because the disclosed hydrator is a dense phase conveyor, full air flow is critical to its performance.

A preferred hydrator comprises a solvation hopper comprising a hopper wall, a hopper inlet, and a hopper outlet to the hopper chamber. There is preferably a hopper inlet conduit sealingly communicating with the hopper through the hopper inlet. The hopper inlet conduit is in communication with the pan through the pan outlet. The hydrator preferably comprises a liquid driven eductor comprising an eductor liquid inlet and an eductor outlet and an eductor suction opening. The eductor suction opening is in sealed communication with the hopper outlet. A transfer means between a slurry storage tank and the eductor outlet transfers the slurry to a storage tank.

The flushing apparatus comprises an automatically operated ¾-inch valve, a spray water valve connected to a source of water, and an automatic two inch shutoff valve, all of which are controlled by a variably programmed electrical control box.

The automatically operated ¾" valve is attached to a vacuum break on the dry soda ash inlet line for reducing the flow of soda ash during the flushing operation.

Water is introduced into the hopper chamber through the spray liquor inlet above the block valve by a spray water valve. The water enters through the sprays or nozzles to effect the removal of the blockage. An automatic 2" shutoff valve is required to prevent the introduction of solvation liquid into the hopper chamber and to allow water to be introduced independently. The introduction of water independent of other liquids allows for maximum dissolution of the chemical in the blockage and aids in reducing the temperature in the hopper chamber if the water is cooler than the solution liquid.

An electrical control box is attached to the frame of the hydrator which controls the automated valves in a timed sequence flushing of approximately 1.5 minutes every 40 minutes. However, the automated system can be variably programmed to backflush and remove potential blockage forming solids accumulation as needed.

To remove solids accumulation in the hydrator, the spray liquor inlet can be turned off and water introduced therethrough, while the flow of soda ash is reduced by breaking the vacuum on the soda ash line. While the chamber or slurry cone of the hydrator is being flushed, blockage removal is such that flow of soda ash or other material is restored in about thirty seconds. The flushing operation continues to ensure removal of substantially all blockage forming solids accumulations. Use of the flushing apparatus in the automatic mode requires no system shutdown, hose removal, or operator attention.

The periodic flushing in the slurrying system in effect anticipates and therefore precludes the occurrence of blockages. Because the system does not need to be shutdown during the flushing operation, unloading time is reduced, with accompanying reductions in operator monitoring, the need for excessive labor, and long stoppage periods.

These and other features can be further understood by reference to the following drawings.

DESCRIPTION OF THE PREFERRED EMBODIMENT

During the course of this description like numbers will be used to identify like elements according to the different figures which illustrate the invention.

Figure 1:
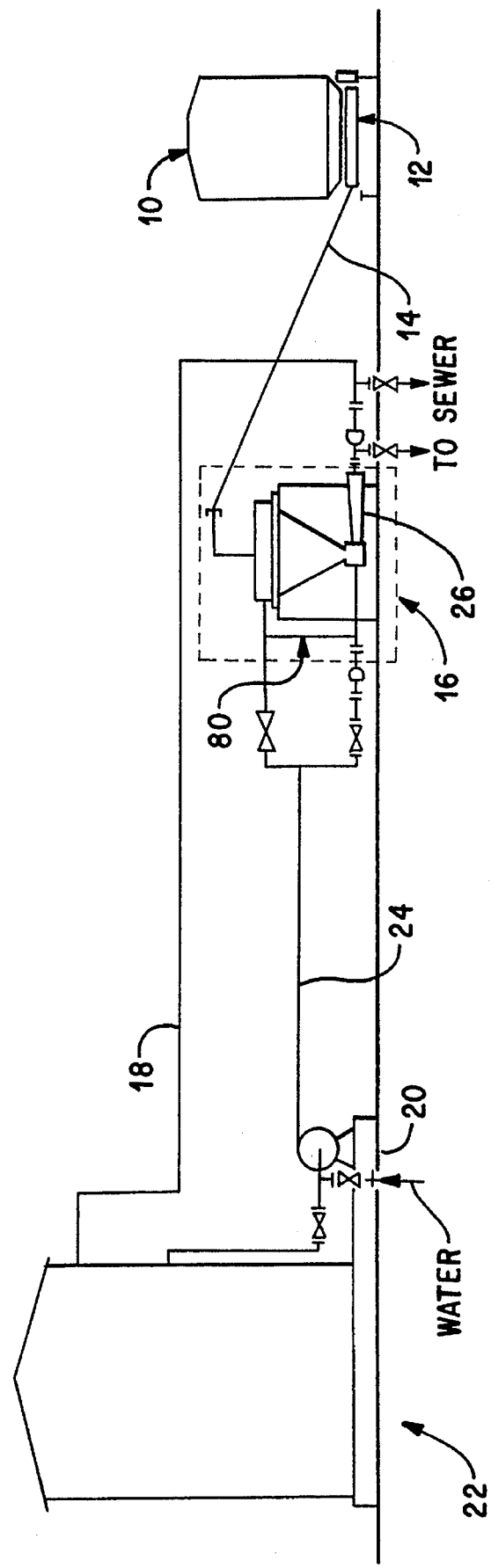
FIG. 1 is a schematic drawing of a system for use with the apparatus of the present invention.

FIG. 1 illustrates a system including the apparatus of the present invention. During operation, dry particulate solid matter is brought to the system from a container, shown in FIG. 1 as railroad car 10. In accordance with the system of the present invention, the contents can be unloaded into an adapter pan 12 located beneath the railroad car 10. The particulate matter is preferably a free flowing material such as soda ash. The particulate matter is continually removed from the railroad car 10 and flows through a suitable conduit such as flexible hose 14.

The particulate matter is transferred from a container through flexible hose 14 to the hydrator 16 by a suction force created by liquid driven eductor 26. The hydrator 16 converts the particulate matter to a slurry or solution which will be referred to as hydrated particulate solids. The hydrated particulate solids are then transferred through a transfer line 18 using suitable transfer means such as pump 20 to storage tank 22. During storage, some of the liquid may rise to the top of the stored solids. The liquid can be recycled back through recycle line 24 to the hydrator 16 for use in the eductor 26 or sent to a waste area.

Figure 2:
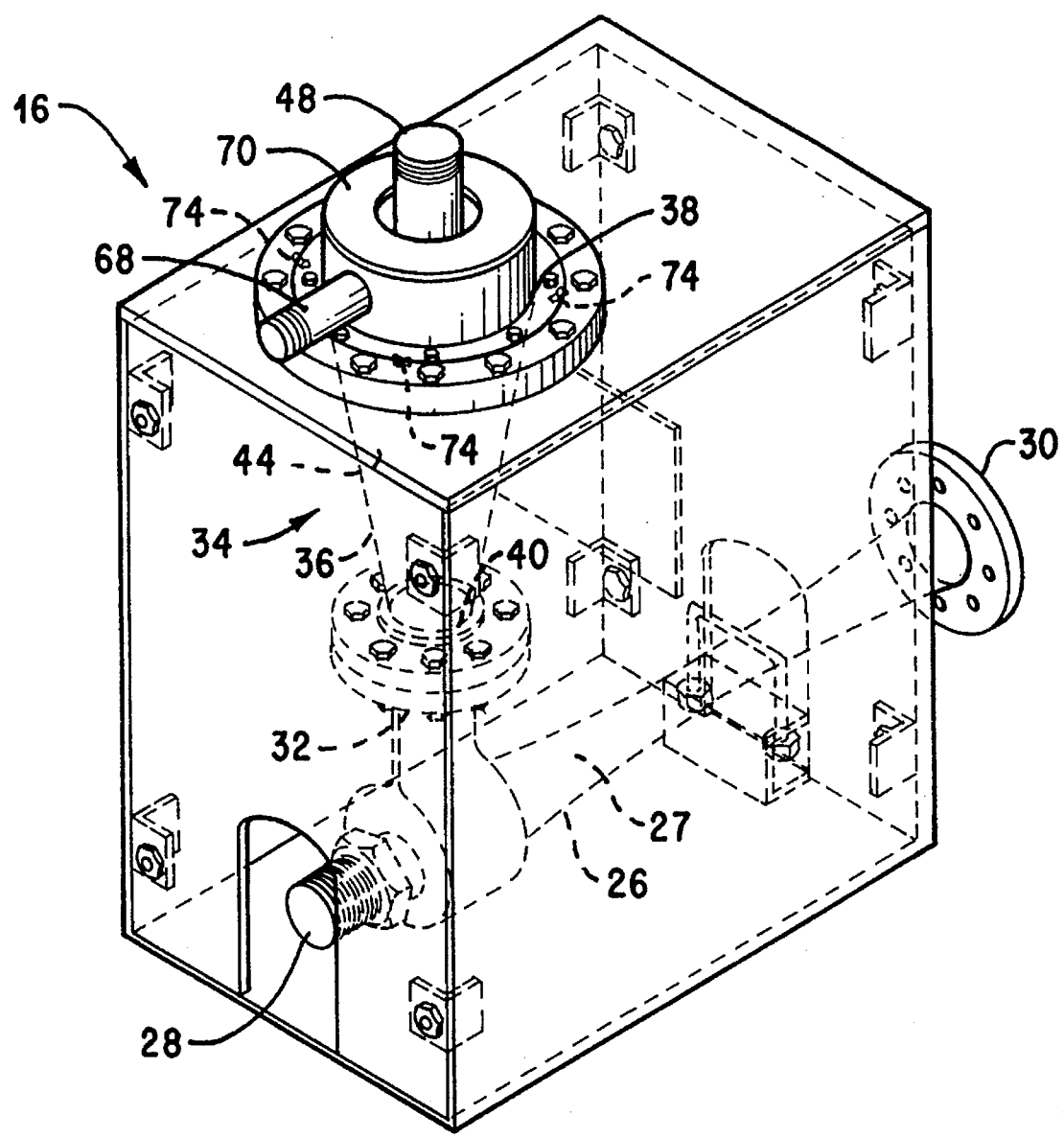
FIG. 2 is an isometric drawing of the hydrator of the present invention.

FIG. 2 illustrates the preferred hydrator 16 and the liquid driven eductor 26 in an isometric drawing. There is preferably a solvation hopper 34 which comprises a hopper wall 36, a hopper inlet 38, and a hopper outlet 40. The hopper outlet 40 is connected to the eductor suction opening 32.

Figure 3:
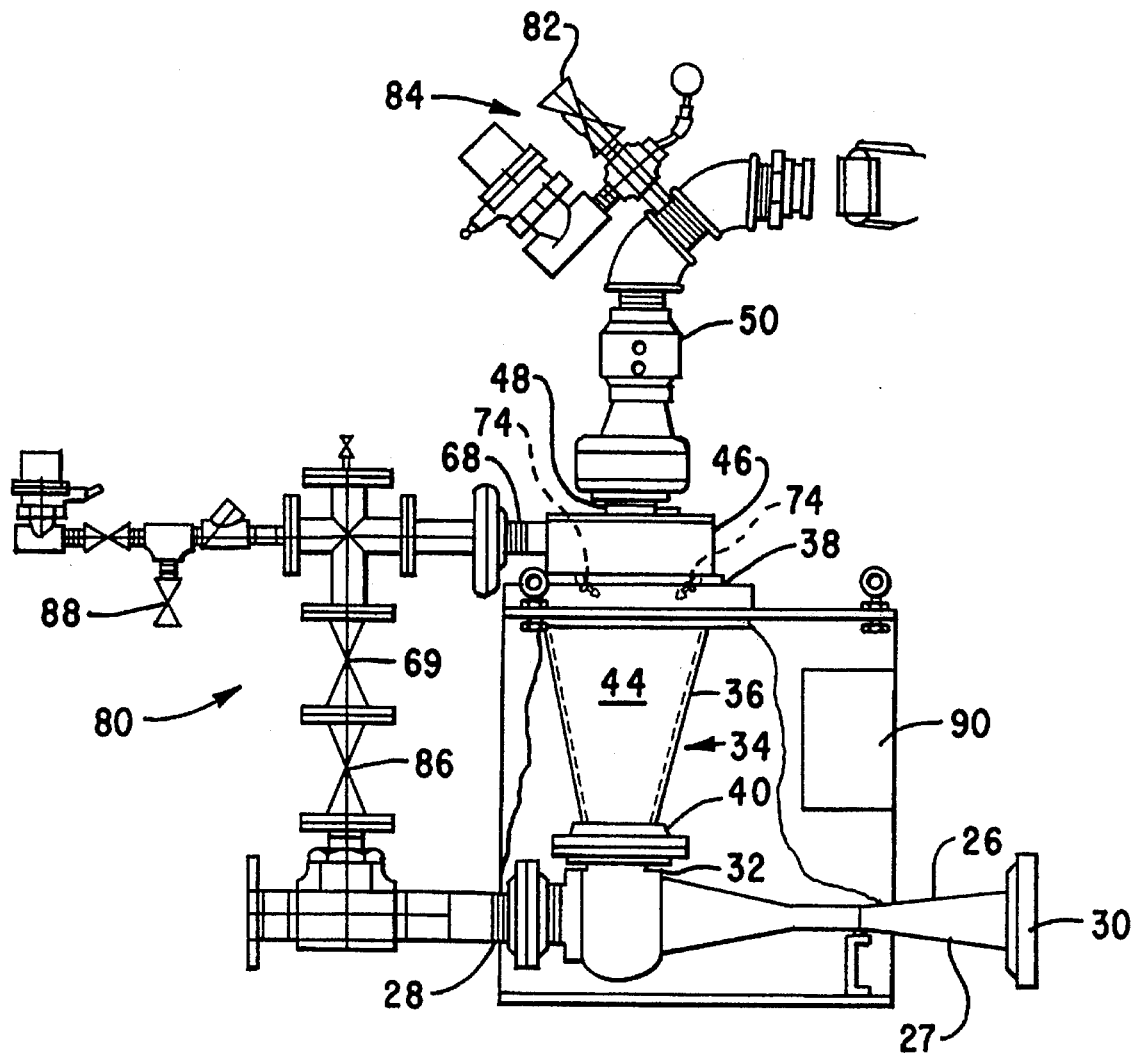
FIG. 3 is a side view of the hydrator showing the flushing apparatus.

Preferably, the hopper outlet 40 is sealingly connected to the eductor suction opening 32 at a hopper outlet flange connected through a sealing gasket to a suction opening flange as illustrated in FIG. 2. The hopper wall 36 preferably defines a hopper chamber 44 in a continuous lateral enclosure. Hopper wall 36 extends from the hopper inlet 38 to the hopper outlet 40. There is suitable communication means between the hopper inlet 38 and the dry particulate solids container 10. The communication means comprise a feed or hopper inlet conduit 48. Preferably, the hopper inlet conduit 48 is sealingly connected to the hopper inlet 38. The hopper inlet conduit 48 communicates between the hopper chamber 44 and the solid particulate feed source, such as railroad car 10. As illustrated in FIG. 3, such communication can include a plurality of separate pieces including a swivel 50 and other flexible conduit elements to enable the hopper inlet conduit 48 to be interconnected to the railroad car 10.

A useful hydrator 16 includes a liquid driven eductor 26 having an eductor liquid inlet 28, an eductor liquid outlet 30, and an eductor suction opening 32. The eductor 26 has a venturi tube 27 which causes a reduction in pressure at eductor suction opening 32. Solvation liquid or eductor liquid flows from eductor liquid inlet 28 to eductor liquid outlet 30. The solvation liquid or eductor liquid is preferably a saturated solution of the dry chemical being transported in a solvent. Solvating liquid is also fed into the hopper chamber 44 to form a hydrated mixture with the particulate solid. This hydrated mixture is drawn into the eductor suction opening 32 and exits from the eductor outlet 30.

Figure 4:
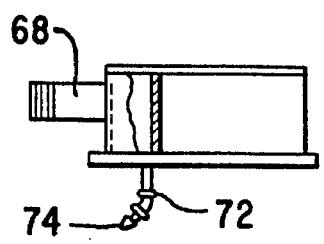
FIG. 4 is a partial sectional view of the top of the hopper showing one nozzle disposed to pass fluid into the hopper.

In certain processes, such as those in which a slurry of soda ash is formed, it is desirable to hydrate the particulate solids as they are transferred into the hopper chamber 44. To hydrate the solids, there are suitable means to feed a solvating liquid into the hopper chamber 44. Preferably, the solvating liquid is fed into the hopper chamber 44 through at least one and preferably a plurality of nozzles 74, shown in FIG. 4.

FIG. 3 is a side view of the hydrator 16 showing the flushing apparatus 80. Liquid is fed into the hopper chamber 44 through solvating liquid inlet 68. The solvating liquid inlet 68 communicates through manifold 70, shown in FIG. 2, to at least one nozzle conduit 72 and finally to nozzle 74, shown in FIG. 4. Preferably, the nozzles 74 are disposed to spray the solvation liquid or water in a direction perpendicular to the hopper chamber interior wall 36 at an angle to the axis of the hopper 34. In this way, the nozzles 74 cause a spray of fluid to be directed in a swirling motion around the hopper wall 36 as the liquid and particles mix and move down toward the eductor suction opening 32 of the eductor 26. The solvating mixture of solvation liquid and solid particles formed in hopper chamber 44 passes through eductor suction opening 32 and is transferred to a suitable storage tank 22 or to direct chemical processing.

Any significant solids accumulation tending to cause blockage in the hopper chamber 44 and slurry cone entry area 46 are removed by the flushing apparatus 80 illustrated in FIG. 3. The flushing apparatus 80 includes an automatically operated ¾-inch valve 82 attached to a vacuum break 84 on the dry chemical inlet line, an automatic two-inch shutoff valve 86, and a spray water valve 88, all of which are controlled by a variably programmed electrical control box 90 attached to the frame of the hydrator 16.

The automatically operated ¾" valve 82 attached to the vacuum break 84 on the dry soda ash inlet line reduces the flow of soda ash during the flushing operation by reducing the vacuum on the inlet line. When the automatic two-inch shutoff valve 86 is activated, the solvation liquid is prevented from entering the hopper chamber 44 through the solvating liquid inlet 68. The activation of the shutoff valve 86 allows water to be introduced independent of any other liquid to ensure maximum dissolution of the blockage.

A supply of water is connected to the solvation liquid inlet 68 through spray water valve 88, located above block valve 69. The water enters the hopper chamber 44 through nozzles 74 to effect removal of the blockage. Water is the preferred flushing liquid for discharge to slurry storage systems. After about thirty seconds, the flow of soda ash is restored at an 8+ tph rate. The flushing operation continues beyond this thirty second period to ensure a substantial elimination of accumulations which could develop into blockages in the hopper chamber 44.

An electrical control box 90 attached to the frame of the hydrator 16 controls the automated valves in a timed sequence flushing of approximately 1.5 minutes every 40 minutes. However, the electrical control box 90 can be variably programmed to remove solids accumulation as needed.

In summary, the flushing apparatus includes an automatically operated ¾-inch valve to reduce the flow of soda ash during the flushing operation, a spray water valve connected to a source of water, and an automatic two-inch shutoff valve for preventing the flow of solvation liquid into the hopper chamber during the flushing operation, all of which are controlled by a variably programmed electrical control box.

The invention requires no system shutdown, hose removal, or operator attention beyond operating the valves or programming the electrical control box. The periodic flushing of the hydrator anticipates and therefore precludes the occurrence of blockages. Because the system does not need to be shutdown during the flushing operation, unloading time is reduced, in addition to operator monitoring, the need for excessive labor and long stoppage periods.

While the invention has been described with reference to the preferred embodiment thereof, it will be appreciated by those of ordinary skill in the art that modifications can be made to the structure and form of the invention without departing from the spirit and scope of thereof.

What is claimed is:

1. A method for transferring a dry particulate chemical from a source, introducing said dry chemical into a liquid carrier medium, and forming a slurry solution, comprising the steps of:

(a) connecting to said source an apparatus comprising:
   a solvation hopper formed from a wall member, said wall member defining a hopper chamber;
   a hopper inlet;
   a hopper outlet opposite to said hopper inlet;
   a plurality of spray nozzles disposed in said hopper inlet of said solvation hopper;
   means for supplying solvation liquid to said spray nozzles;
   a chemical inlet pipe passing through said hopper inlet to connect said hopper chamber to said source; and
   a liquid driven eductor having a liquid inlet pipe, a liquid outlet pipe, and a suction opening, said suction opening being sealingly connected to said hopper outlet,
   wherein when liquid flows through said liquid driven eductor a suction is created within said chemical inlet pipe, and wherein said spray nozzles are oriented such that said solvation liquid flowing through the spray nozzles flushes said hopper chamber;

(b) supplying a flow of said solvation liquid to said liquid driven eductor to draw the dry chemical from said source into said solvation hopper;

(c) supplying a flow of liquid as said solvation liquid to the spray nozzles such that the dry chemical in the hopper is mixed with the said solvation liquid to form the slurry solution which is removed from said solvation hopper through said suction opening of said liquid driven eductor;

(d) recovering said chemical from said eductor outlet pipe in said solvation liquid, wherein said liquid comprises a combination of the solvation liquid introduced through said spray nozzles and the solvation liquid supplied to said eductor; and (e) flushing said hopper chamber automatically and periodically with water to remove accumulations of said chemical while reducing flow of the dry particulate chemical into said solvation hopper from said source.

2. The method according to claim 1, further comprising the step of transferring said slurry solution to slurry storage.

3. The method according to claim 2, wherein said flushing occurs in a timed sequence of approximately 1.5 minutes every 40 minutes.

4. The method according to claim 3, wherein the solvation liquid comprises a saturated solution of the dry chemical being transported in a solvent.

5. The method according to claim 4, wherein said dry chemical is soda ash or calcium chloride.

6. The method according to claim 5, wherein said source is a railroad car.

* * * * *